TIME RECORDING IN DATA STORAGE SYSTEMS
Filed Nov. 25, 1955
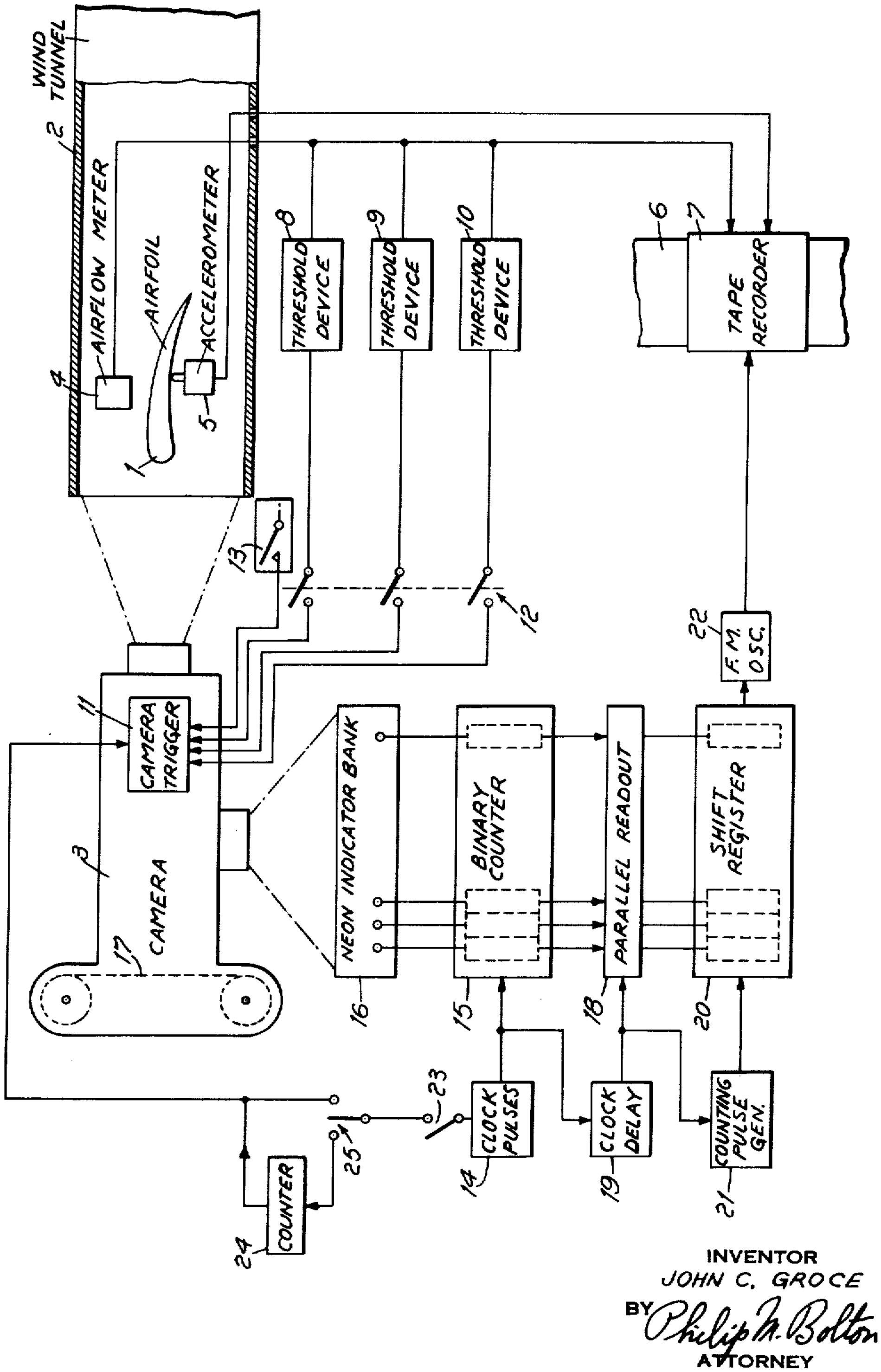
INVENTOR
JOHN C. GROCE
BY Philip M. Bolton
ATTORNEY 2,993,195

TIME RECORDING IN DATA STORAGE SYSTEMS

John C. Groce, Nutley, N.J., assignor to International Telephone and Telegraph Corporation, Nutley, N.J., a corporation of Maryland Filed Nov. 25, 1955, Ser. No. 548,971
6 Claims. (Cl. 340—172.5)

This invention relates to time recording in data storage systems, particularly those data storage systems having a plurality of different types of stores with the time of storage in each being required, for example, for correlation of the separately stored data.

In storing data it is often desirable to store the data in different stores and, even further, in different types of stores. For example, in general, visual data is best stored photographically while auditory data may be more satisfactorily converted into electrical waves or into electrical pulses in code form and stored magnetically on tapes, drums, or the like. If the data to be stored in the different stores are related in time as, for example, where they represent two events occurring simultaneously or different aspects of a single event, it is desirable that the time of occurrence be indicated in each of the stores to permit correlating the data in the different stores on a time basis.

An object of the present invention is the provision of a data storage system having a plurality of stores, in which the time of storage of the data in each store is recorded therein.

In certain storage media, recording is continuous with single items being stored serially, such as, for example, recording on magnetic tapes, drums, etc. On the other hand, other storage devices are best adapted to record discontinuously with groups of data being simultaneously recorded, such as in conventional photography.

Another object of the present invention is the provision of a data storage system in which data is stored serially in one store, and in parallel and discontinuously in another store, and in which time is recorded in both stores.

According to a feature of the present invention, time is encoded and the code digits are stored serially in the first-mentioned store while the code digits are recorded in parallel in the second-mentioned store.

According to a further feature of the present invention, a single common "clock" is used for providing the time information for both stores.

Throughout the specification and claims, the terms "store and record" or "storage and recording" are used interchangeably without any distinction whatsoever in meaning, and each of the terms refers to both permanent and/or temporary storage or recording.

Other and further objects of the present invention will become apparent, and the foregoing will be better understood with reference to the following description of an embodiment thereof, reference being had to the drawing, in which the figure is a schematic and block diagram of a data storage system, such as might be employed in recording the data of tests on an airfoil in a wind tunnel.

In carrying out the present invention, a plurality of different stores, at least one for continuous sequential and one for discontinuous parallel recording, are provided. A single clock source provides pulses at a predetermined rate, which pulses are counted in a binary counter. The output of the binary counter is fed in parallel to the parallel recording or storing device, and also fed, by means of a suitable translation, in serial form to a serial store. The parallel store may be a camera with the parallel time information being used to operate a bank of lights, the camera taking a picture of these lights at the same time as it takes a picture of the events to be recorded. The sequential or serial recorder may be a magnetic or tape recorder to which the encoded time pulses are fed, it being preferred that these pulses first be used to modulate a continuous frequency modulation oscillator by frequency shift keying thereof, the frequency modulated information then being applied to one storage channel of a multichannel store, such as one track of a multitrack tape. Other aspects of the event to be recorded, such as telemetric measurements thereof, sound recordings thereof, etc., are applied to other channels, i.e., other tracks of the tape.

Referring now specifically to the figure, the present invention is illustrated in connection with the recording of data of tests of an airfoil 1 in a wind tunnel 2. A photograph of the configuration of the airfoil is taken by camera 3, while simultaneously an airflow meter 4 indicates the wind velocity, and an accelerometer 5 records the vibration on separate tracks of a tape 6 and a tape recorder 7. It may be desired to take photographs each time the wind velocity in the tunnel reaches a different level and, for this purpose, the airflow meter 4 may be connected via a plurality of threshold devices 8, 9, and 10 to the camera trigger 11 via a switch 12, so that the camera is tripped each time the wind velocity in the tunnel rises above a threshold set by one of said devices 8, 9, 10, etc. On the other hand, it might be desired to control the tripping of the camera manually, and for this purpose a manual control 13 might also be provided. The data stored on the tape 6 from the airflow meter 4 is in the form of a wave whose amplitude indicates the wind velocity and is continuously recorded. The accelerometer 5 also produces a wave which is also continuously recorded on the tape 6. On the other hand, the camera 3 operates only when it is triggered and takes a photograph of the configuration of the airfoil.

In order that the data stored on tape 6 and in the film in camera 3 may be correlated, time is recorded in both devices as follows:

The basic time-determining element of the system is a source of clock pulses 14. This may be controlled by a chronometrically governed motor and delivers pulses of, for example, a microsecend duration spaced apart, for example, one second. The source of clock pulses 14 is connected to a binary counter 15, which counts the pulses, and at the rate indicated a seventeen-stage binary counter will give roughly 24 hours of counting of pulses one second apart before being automatically reset to zero count. The time thus encoded in binary form may be visually indicated by connecting a bank 16 of seventeen neon indicator lamps to the counter 15, one tube being associated with each binary stage so that, depending on the condition of its stage, a lamp will be lit or unlit. The camera 3 is so arranged that when the camera is triggered, not only is a picture made of the event, but also the bank of lights is photographed on a portion of the same film 17. Various arrangements for doing this are obvious, one known type of camera suitable for this purpose being the "Fairchild Periscope Camera." Thus, the encoded time information, which is presented in parallel form by the neon bank 16, is recorded in parallel and simultaneous with the event being recorded in the same store 17.

The time encoded in the binary counter, which exists in parallel form, is transformed to a form suitable for recording on one track of the magnetic tape 6. Each of the stages of the binary counter is connected to a parallel read-out gate 18, which is actuated by a pulse from the clock source 14, which is suitably delayed in a delay device 19 to allow time for the binary stage to reach its stable state after receiving a timing pulse, whereupon the delayed pulse from delay 19 triggers the gate 18 closing each of the individual gate circuits each associated with a separate stage of the counter, and applying information as to the state of each stage to a shift register 20, where this information is stored. After the information is stored in the shift register 20, it is extracted therefrom sequentially under the control of the delayed clock pulses from delay 19, each pulse being applied to a counting pulse generator 21 to produce a number of read-out pulses equal to the number of stages in the shift register and, in the given example, this would be seventeen. The shift register is of the open-line variety. Therefore, upon the application of a suitable number of sequential shift pulses (seventeen in the example given), the register will have emptied itself automatically in readiness for the next cycle of operation. The information emitted from the shift register is essentially a time sequential picture of the respective states of the binary counter 15, the output of the shift register being a binary sequence of ones and zeros coded to indicate the elapsed time. More specifically, the ones and zeros are represented by either a high-voltage or low-voltage output. This serial digital output is applied to shift-frequency modulate FM oscillator 22. The output of this oscillator, therefore, oscillates at one of two predetermined frequencies, the frequency of oscillation being determined by the level of the input voltage from the shift register. There are two main reasons for digitally including the information in this form. The first reason lies in the fact that the binary system of encoding, since it requires only two levels, is a highly efficient system. Therefore, a lower signal-to-noise ratio may be tolerated in the storage system without introducing undue error in the stored information. The second reason is that the frequency modulated information may be recorded on the magnetic tape at saturation amplitudes and decoded through a limiter. It is thus possible to remove essentially all amplitude variations from the tape. Dropouts caused by inhomogeneous magnetic coating and other irregularities of the tape which tend to cause amplitude variation are thus minimized.

In many instances, it may be desirable that the recording in the camera should occur on a time basis instead of on the basis of other factors, such as, in the present illustration, wind velocity. For this purpose, the source of clock pulses may be connected either directly via switch 23 to the camera trigger, or indirectly via a counter 24 and switch 25 to the camera trigger. Thus, photographs could be taken at the same rate at which clock pulses are being emitted, or at a slower rate, or a faster rate.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a data storage system, first and second data storing devices, said first storing device being continuously operative and said second storing device being normally inoperative, means for continuously applying data representative of a first aspect of an event to said first storing device, means for regularly applying index marking signals to said first storing device, each said index marking signal comprising a group of sequentially generated code signal elements providing a digital representation of elapsed time, a plurality of condition responsive signal generating devices, means for selectively applying the output of each said condition responsive device to said normally inoperative second storing device, means associated with said second storing device for rendering said device operative in response to said selectively applied signals, means for transferring data representative of a second aspect of said event to said second storing device during the operation thereof, and means for simultaneously transferring signals corresponding to said code signal elements in parallel to said second storing device.

2. In a data storage system, a first recording device for producing discrete records of a first aspect of a condition, control means for operating said first device at selected instants, a second recording device for producing a continuous record of a second aspect of said condition and means for correlating said discrete records with discrete portions of said continuous record comprising a source of periodically varying code signal combinations which numerically designate time, first transfer means coupled between said source and said first recording device under the control of said control means for transferring said code signal combinations to said discrete records at said selected instants, and second transfer means coupled between said source and said second recording device for sequentially transferring said code signal combinations to said continuous record in predetermined time relation to each said periodic variation of said combinations.

3. In a data storage system, a first recording device for producing discrete records of a first aspect of a condition, control means for operating said first device at selected instants, a second recording device for producing a continuous record of a second aspect of said condition, and means for correlating said discrete record with discrete portions of said continuous record comprising a counter including a multiplicity of digit registers for providing signal combinations representing the numerical value of the state of said counter, a source of periodic clock pulses, means for applying said clock pulses to said counter to periodically augment said numerical value by unit amounts, first transfer means coupled between said digit registers of said counter and said first recording device under the control of said control means for simultaneously transferring code signal marks in correspondence with the conditions of said digit registers to each said discrete record at said selected instant at which said discrete record is produced, and second transfer means coupled between said counter and said second recording device under the control of said clock pulses for sequentially transferring code signal marks corresponding to the conditions of said digit registers to said continuous record in predetermined time relation to each said clock pulse.

4. A data storage system according to claim 3 wherein said first recording device is a photographic device and said first transfer means includes a bank of light sources individually controlled by corresponding ones of said digit registers, and a shutter mechanism operated at said selected instants intermediate each said discrete record and said bank of lights sources.

5. A data storage system according to claim 3 wherein said counter is a binary counter and said second transfer means includes means responsive to each said clock pulse for producing a number of transfer pulses corresponding to the number of said digit registers in said counter and means operative in response to said transfer pulses to sequentially transfer to said continuous record marks corresponding to the conditions of said digit registers.

6. A data storage system according to claim 5 wherein said continuous record comprises a multitrack magnetic tape and said means operative in response to said transfer pulses comprises an oscillator inductively coupled to one track of said tape and operative to first and second stable frequency conditions, and selective means coupled to said oscillator and to said counter for determining said stable frequency conditions of said oscillator in accordance with the conditions of said counter registers and in a sequence controlled by said transfer pulses produced by said means responsive to said clock pulses.

(References on following page)

References Cited in the file of this patent

UNITED STATES PATENTS

| | | |
|---|---|---|
| 2,211,847 | Bryce | Aug. 20, 1940 |
| 2,564,403 | May | Aug. 14, 1951 |
| 2,595,701 | Potter | May 6, 1952 |
| 2,610,226 | Klaasse | Sept. 9, 1952 |
| 2,611,803 | Rumbaugh | Sept. 23, 1952 |
| 2,633,055 | Badmaieff | Mar. 31, 1953 |
| 2,690,472 | Boucheron | Sept. 28, 1954 |
| 2,702,380 | Brustman et al. | Feb. 15, 1955 |
| 2,870,429 | Hales | Jan. 20, 1959 |

OTHER REFERENCES

Design Features of Era, 1101, F. C. Mullaney, Elec. Eng., vol. 71, issue 11, November 1952, pp. 1015–1018.